United States Patent [19]

Rieger et al.

[11] Patent Number: 4,751,975
[45] Date of Patent: Jun. 21, 1988

[54] ANTI-SKID DEVICE FOR MOTOR VEHICLES

[75] Inventors: Hansjörg W. Rieger; Wolfgang Biehler; Peter Hofmann, all of Aalen-Unterkochen, Fed. Rep. of Germany

[73] Assignee: RUD-Kettenfabrik Rieger & Dietz GmbH u. Co., Aalen-Unterkochen, Fed. Rep. of Germany

[21] Appl. No.: 887,907

[22] Filed: Jul. 18, 1986

[30] Foreign Application Priority Data

Jul. 19, 1985 [DE] Fed. Rep. of Germany ....... 3526359
Sep. 11, 1985 [DE] Fed. Rep. of Germany ....... 3532801

[51] Int. Cl.⁴ ..................... B60T 1/04; B60C 27/00
[52] U.S. Cl. ..................... 180/16; 152/222; 188/4 B; 280/757
[58] Field of Search ............... 180/7.1, 16, 313; 188/4 R, 4 B; 152/208, 213 R, 213 A, 214, 215, 216, 221, 222, 223, 231, 232, 233, 243; 280/757

[56] References Cited

U.S. PATENT DOCUMENTS

| 1,150,148 | 8/1915 | Putnam | 188/4 B |
| 1,374,252 | 4/1921 | Thorne et al. | 188/4 B |
| 1,381,001 | 6/1921 | Norman | 188/4 B |
| 2,241,923 | 5/1941 | Ridgway | 188/4 B |
| 2,283,948 | 5/1942 | Ridgway | 188/4 B |
| 2,815,828 | 12/1957 | Schaeffer | 188/4 B |

FOREIGN PATENT DOCUMENTS 3433620  3/1986  Fed. Rep. of Germany ...... 152/208

Primary Examiner—John J. Love
Assistant Examiner—Charles R. Watts
Attorney, Agent, or Firm—Mark P. Stone; F. Eugene Davis, IV

[57] ABSTRACT

In an anti-skid device for motor vehicles with a plurality of resilient spreading arms (5) distributed over the circumference of a support (1) which can be set into a revolving motion for chain strands (3) forming anti-skid means, the spreading arms (5) are formed by compression springs (8) which are precompressed by connecting elements (13) which connect the chain strands (3) to the support (1).

21 Claims, 3 Drawing Sheets

ANTI-SKID DEVICE FOR MOTOR VEHICLES

BACKGROUND OF THE INVENTION

The invention relates to an anti-skid device for motor vehicles with a plurality of resilient spreading arms distributed over the circumference of a support which can be pressed against the tire of a vehicle and can be set into a revolving motion, to which chain strands forming the anti-skid means are attached, of which the ends remote from the spreading arms are thrown away from the support by the effect of centrifugal force when the support revolves in the service position, and of which at least parts pass through the region of the ground contact surface of the tire when the vehicle tire rotates.

An anti-skid device of the above-mentioned type is known from German Offenlegungsschrift No. 2,914,366, in which the spreading arms are constructed as cable sections or chain strand sections firmly enclosed by rubber envelopes. The rubber envelopes in this case exhibit at one end a head provided with an annular groove, which serves conjointly with a closing ring to anchor the spreading arms to the support, and the resilient properties of which should permit an easy exchange of the spreading arms and of the chain strand retained by them. The known solution cannot be satisfactory, if only because here the strength of the anchorage of the spreading arm and of the chain strand connected to them on the support is inadequate. Apart from this fact, the vulcanization process which is unavoidable in the case of the known construction represents an unfavorable burden on the production costs of the spreading arms.

The object of the spreading arms is to transfer the chain strands, which form the anti-skid means, into a favorable position relative to the tire rolling surface and/or to the wedge gap between vehicle tires and road. Any entangling of the chain strands should also be counter-acted. The same purpose is served in an anti-skid device known from U.S. Pat. No. 3,068,949 by traction springs interposed between the anti-skid elements and the support, one end of each of which exhibits an eye for a screwbolt serving for fastening the springs to the support. In the case of this second known device the traction springs, due to the fact that they have to transmit powerful centrifugal forces, must exhibit substantial torsion cross-sections, which impose narrow limits to their flexibility. Furthermore, substantial cyclic forces occur in the transition region between the fastening eye and the main part of the spring; these involve the danger of premature fatigue fractures.

Lastly, French Pat. No. 409,260 discloses an anti-skid device in which chain strands forming anti-skid means are connected by springs to a support. However, in this device the support is not adapted to be pressed against the vehicle tire, and the springs serving to drive it are likewise exposed to not inconsiderable traction forces.

SUMMARY OF THE INVENTION

The underlying aim of the invention is to produce an anti-skid device of the type discussed, which can be produced at favorable cost, ensures reliable mounting of the chain strands forming the anti-skid means on the support, and in which the spreading arms move back into their initial position rapidly and without major vibratory movements. This aim is achieved according to the invention in that the spreading arms are formed by compression springs which are pre-tensioned by connecting elements which connect the chain strands to the support.

The anti-skid device according to the invention presents the advantage that, due to the use of pre-tensioned compression springs as spreading arms, the entry and exit of the anti-skid means into and out of the region of the ground rolling surface of the tire is definitely improved, whilst a whiplash effect of the spreading arms which occurs in the case of the known constructions is avoided. Due to the facts that the chain strands forming the anti-skid means are connected to the support by connecting elements, and not by the spreading arms, their correct and secure anchorage to the support is ensured. It is furthermore possible, contrary to the case of constructions of the type first described, to combine one and the same connecting element with compression springs of different rigidity, so as to achieve an adaptation of the service behavior of the device to different conditions.

In the anti-skid device according to the invention the compression springs are deformed maximally in the region of their ends near the support during service. Particularly if the connecting elements are formed by chain strand sections, it is then possible for contacts to occur between the connecting elements and the compression springs, which promote wear phenomena on the compression springs. In order to protect the compression springs in proximity of their ends near the support from a direct contact with parts of the connecting elements, particularly with members of chain links, as a further development of the invention sleeves are arranged between the connecting elements and the compression springs in the region of the ends of the compression springs facing the support. In this manner the service life of the compression springs and therefore of the anti-skid device generally can be prolonged.

BRIEF DESCRIPTION OF THE DRAWINGS

Further particulars and features of the construction according to the invention will emerge from the subordinate claims and from the description, given below, of the exemplary embodiments illustrated in the accompanying drawing, wherein:

BEST MODE FOR CARRYING OUT THE INVENTION

Figure 1:
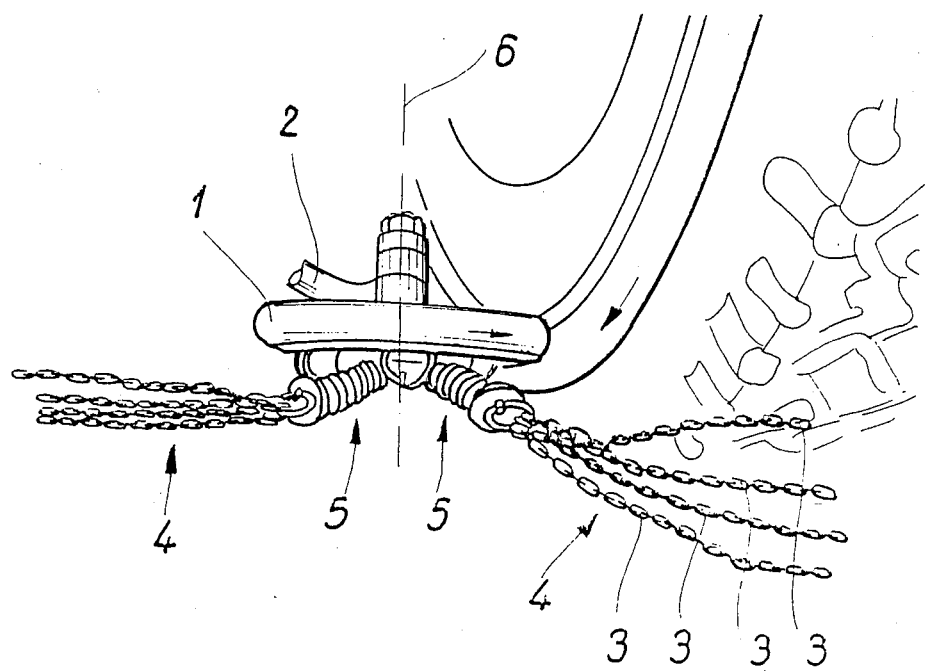
FIG. 1 shows a perspective view of an anti-skid device in service.

In FIG. 1, 1 designates the support, constructed as a friction wheel, of an anti-skid device which is attached to a jib arm 2. The support 1 is equipped with six chain strand groups 4 distributed uniformly on its circumference and each consisting of four chain strands 3, only two of which have been illustrated in order to improve the clarity. The individual chain strand groups 4 are connected to the support 1 by resilient spreading arms 5.

Figure 2:
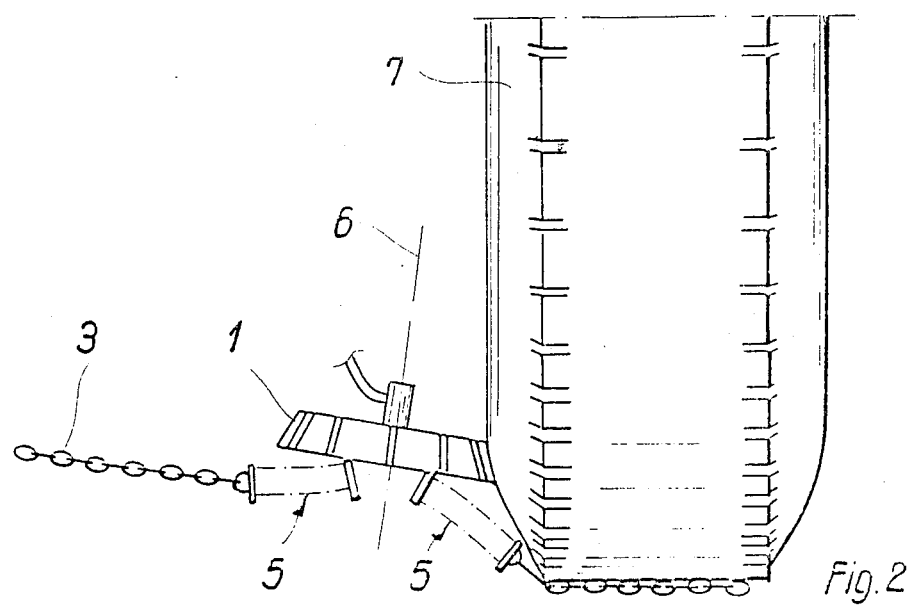
FIG. 2 shows very diagramatically the elevation of an anti-skid device in service.

As FIG. 2 shows clearly, the axis of rotation 6 of the support 1 is placed obliquely to the road, and the spreading arms 5, to each of which only one chain strand is connected in the case of FIG. 2, are themselves placed obliquely to the axis of rotation 6, so that they are oriented obliquely to the rolling surface of the tire 7.

Figure 3:
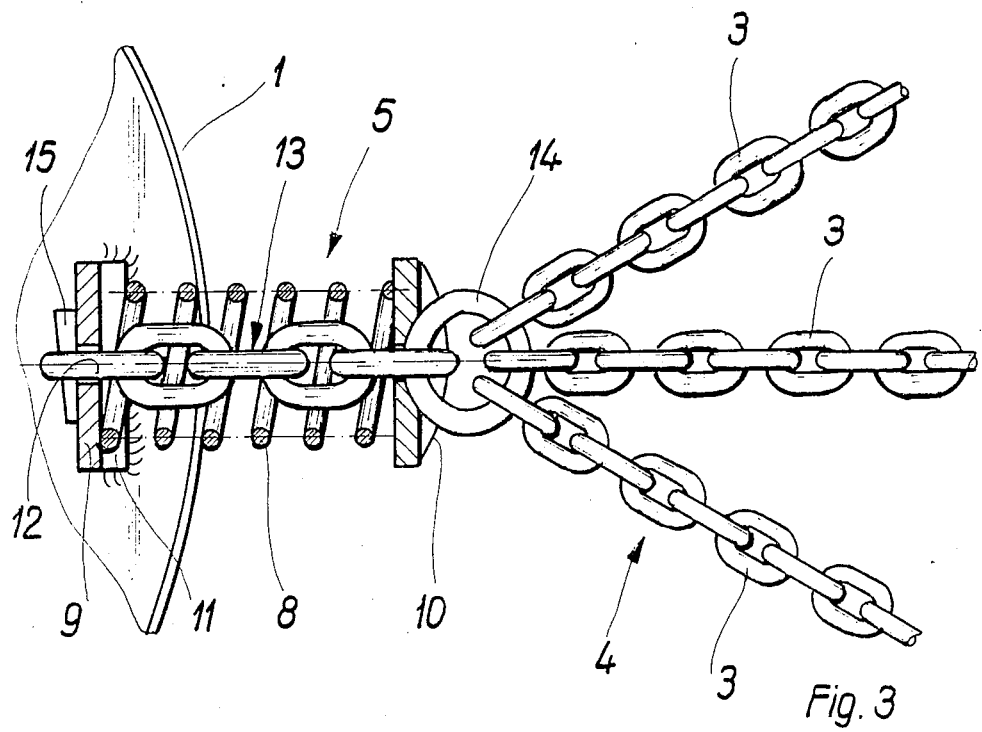
FIG. 3 shows on a larger scale the construction of a spreading arm for an anti-skid device of the type illustrated in FIGS. 1 and 2.
Figure 4:
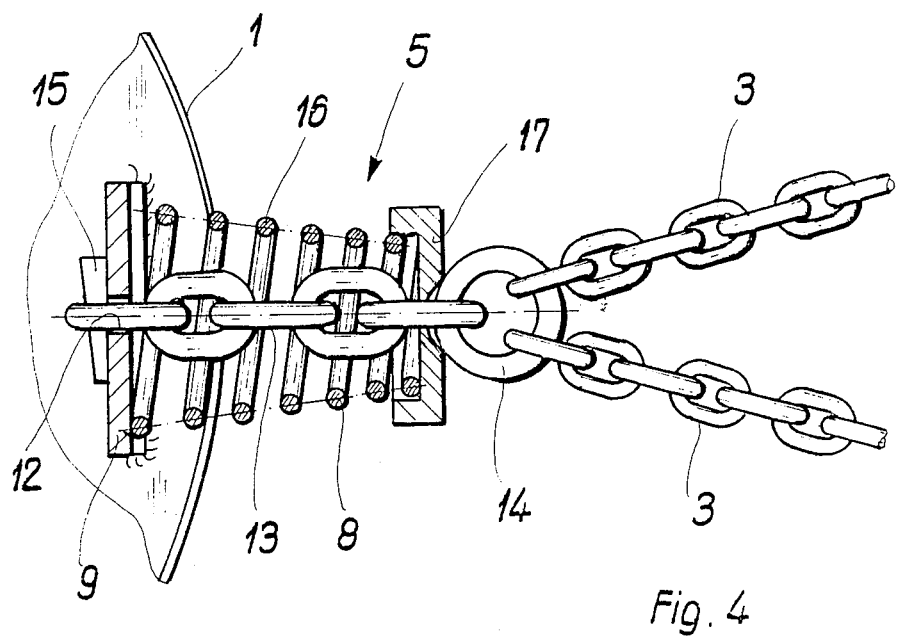
FIG. 4 shows a slightly modified embodiment of a spreading arm.

Particulars of the construction of the spreading arms 5 are clear from FIGS. 3 and 4.

In FIG. 3 the spreading arm 5 is formed by a cylindrical compression spring 8, which is arranged between two abutments 9 and 10. The abutment 9 is connected firmly to the support and forms a bracing surface 11 oriented obliquely to the underside of the support for the one end of the compression spring 8. The end link of a chain strand section 13, which forms a connecting element, which connects the chain strands 3, which are combined by a ring 14 to form a chain strand group 4, to the support 1, projects through a recess 12 of the abutment. The end link is then secured to the support 1 by a locking member 15.

The ring 14 forms a stop for the abutment 10. The interval between the abutments 9 and 10 is chosen so that the compression spring 8 is subjected to an adequate pre-tension, at the same time however it must be ensured that the turns of the spring 8 do not touch mutually. In the manner described, it is achieved that the spreading arm is adequately flexible on the one hand, but on the other hand does not tend to undesirably intense vibrating movements. It is found advantageous that the compression spring 8 can be utilized simultaneously for the anchorage of the locking member 15.

The spreading arm according to FIG. 4 corresponds largely to the spreading arm according to FIG. 3. The same reference numerals have therefore been used for mutually corresponding parts, so that is is only necessary here to point out the differences between the two constructions.

Whereas a cylindrical compression spring is used in the exemplary embodiment according to FIG. 3, the compression spring 16 forming the spreading arm 5 according to FIG. 4 is of conical construction. In addition, the abutment 17 remote from the support 1 has the form of a cap which guides the free spring end.

Figure 5:
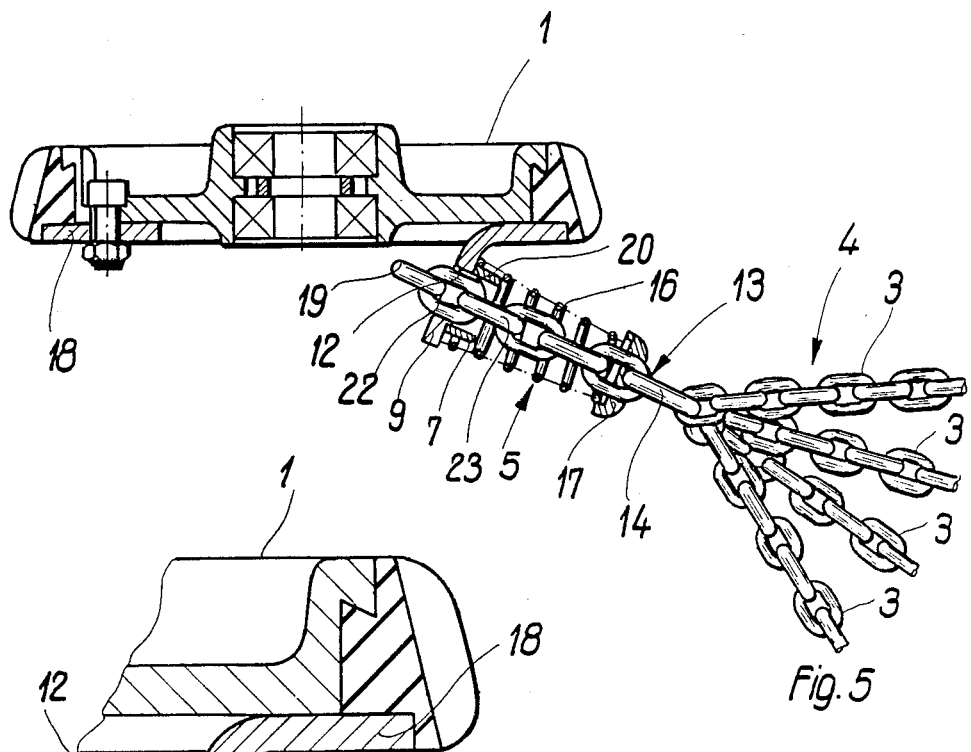
FIG. 5 shows a section through a particularly simple construction of a support of an anti-skid device, in which only one spreading arm for chain strands is illustrated for the sake of clarity.

In FIG. 5, 1 designates a support, to the underside of which a disc-shaped stamping 18 is screwed, and which serves for the mounting again of chain strands 3 combined into groups or bunches 4. In practice, six chain strand bunches are distributed uniformly over the circumference of the support. Spreading arms 5 are anchored to the support, each by an obliquely angled chain link 19. Sleeves 20, the external edge 21 of which is rounded or exhibits a chamfer, are present on the support ends of the spreading arms 5. The sleeves 20 form centering means for compression springs 16 which are arranged between two abutments 9 and 17, of which abutments 9 are formed by bent tongues of the stamping 18. The chain link 22, which is guided in a recess 12 of the abutment 9, is used to fix the position of the sleeve 20 relative to the abutment 9. 13 designates a protecting element constructed as a chain strand section, which connects the chain strands 3 to the support. A ring 14, which combines the chain strands 3 to form a chain strand group, is arranged at the end of the connecting element 13.

As indicated in FIG. 4, the compression spring 16 is of conical construction at least along part of its length. Its free end may however also be cylindrical. The spreading arms 5 become deformed during the service of the anti-skid device. The greatest deformation then occurs in the region of the link 23 of the chain strand section forming the connecting element 13. The sleeve 20 prevents frictional contacts, which promote wear, occurring between the link 23 and the turns of the compression spring 16 located in its proximity. For this purpose the sleeves 20 project into the compression springs 16 for a distance which corresponds to the height of 2 to 3 spring turns.

Figure 6:
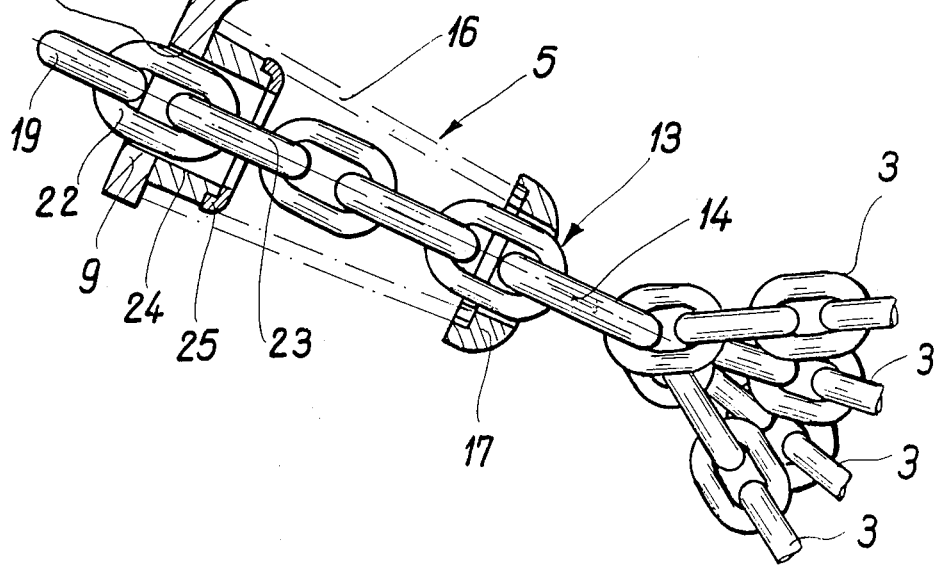
FIG. 6 shows on a larger scale a spreading arm slightly modified compared to the construction according to FIG. 2.

In the exemplary embodiment according to FIG. 5 the sleeve 20 is of cylindrical construction. By contrast, a sleeve 24 with a conical external wall is illustrated in FIG. 6. An anti-wear ring 25, which is arranged on the end of the sleeve facing the chain strands 3, consists of a suitable material, particularly a plastic such as nylon or teflon. In both the cases illustrated, the sleeves 20 and 24 are retained in their desired position due to the conicity of the compression springs 16.

We claim:

1. Anti-skid device for motor vehicles, comprising:
   support means rotatably mounted about an axis of rotation;
   a plurality of chain strands connected to and distributed about said support means;
   spreading arm means, comprising a plurality of springs attached to said support means, for biasing said plurality of chain strands outward from said support means;
   said support means including a rim means for engaging a tire of a vehicle wheel such that said support means is rotated about said axis as said tire rotates, thereby causing at least parts of said chain strands to be thrown under the tire as anti-skid means;
   characterized in that said springs are compression springs, said compression springs being precompressed by connecting elements which connect the chain strands to the support means.

2. Device according to claim 1, characterized in that the chain strands forming anti-skid means are directly connected to the support means by the connecting elements so that the compression springs (8, 16) are arranged outside the flux of force of centrifugal forces transmitted from the chain strands (3) to the support means (1).

3. Device according to claim 1, characterized in that the compression springs (8, 16) are helicoidal springs.

4. Device according to claim 1, characterized in that the connecting elements (13) are anchored to the support means (1) by releasable locking members (15, 19).

5. Device according to claim 1, characterized in that a plurality of chain strands (3) combined to form chain strand groups (4) are attached to each of the connecting elements (13).

6. Device according to claim 1, characterized in that the connecting elements are formed by chain strand sections (13).

7. Device according to claim 1, characterized in that the compression springs (16) are of conical construction.

8. Device according to claim 1, characterized in that the support means is provided with abutments, each abutment supporting the end of a compression spring facing the support means.

9. Device according to claim 8, characterized in that the abutments facing the support means are oriented obliquely to the axis of rotation of the rotatable support means which is plate-shaped.

10. Device according to claim 1, characterized in that the chain strands which form anti-skid means are attached to each connecting element by an intermediate member which serves to anchor an abutment supporting the end of the compression spring remote from the means.

11. Device according to claim 10, characterized in that the intermediate members are constructed as a ring (14).

12. Device according to claim 10, characterized in that abutments (17) remote from the support means (1) for the compression springs (16) are of cap-like construction.

13. Device according to claim 1, characterized in that at the ends of the compression springs facing the support means, sleeves are arranged between the connecting elements and the compression springs.

14. Device according to claim 13, characterized in that the compression springs are of conical construction at least on a part of their length and due to their conicity, said compression springs secure the sleeves against displacements.

15. Device according to claim 14, characterized in that the sleeves (24) are also of conical construction, whilst their external surfaces coincide approximately with an interior envelope surface of the compression springs (16).

16. Device according to claim 13, characterized in that external edges (7) of the sleeves (6) are provided with a rounding or chamfer at least at their ends remote from the support means (1).

17. Device according to claim 13, characterized in that the external edges of the sleeves (24) are provided with an anti-wear ring (25) at least at their ends remote from the support means (1).

18. Device according to claim 13, characterized in that the sleeves (20;24) project into the compression springs (16) for a distance which corresponds to the height of 2 to 3 spring turns.

19. Device according to claim 13, characterized in that the sleeves (20;24) are centered each by at least one link (22) of a chain strand section forming the respective connecting element (13).

20. Device according to claim 13, characterized in that the sleeves (20;24) are braced by their ends remote from the chain strands (3) forming anti-skid means, against abutments (9) which are formed by tongues of a disc-shaped stamping (18).

21. Device according to claim 20, characterized in that the stamping (18) is connected releasably to the support means (1).

* * * * *